United States Patent
Sun et al.

(10) Patent No.: US 7,477,486 B1
(45) Date of Patent: Jan. 13, 2009

(54) AIR BEARING SLIDER WITH A SIDE PAD HAVING A SHALLOW RECESS DEPTH

(75) Inventors: Biao Sun, Fremont, CA (US); Ji-Feng Ying, San Jose, CA (US); Forhad Hossain, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 448 days.

(21) Appl. No.: 11/296,735

(22) Filed: Dec. 7, 2005

(51) Int. Cl.
*G11B 5/60* (2006.01)
*G11B 21/21* (2006.01)

(52) U.S. Cl. ............... 360/236.3; 360/235.7; 360/236.5; 360/237

(58) Field of Classification Search ............... 360/236.3, 360/237, 235.7, 236.5
See application file for complete search history.

(56) References Cited

U.S. PATENT DOCUMENTS

| | | | |
|---|---|---|---|
| 4,692,832 A | 9/1987 | Bandara et al. | |
| 4,785,161 A | 11/1988 | Strom | |
| 4,835,361 A | 5/1989 | Strom | |
| 4,948,460 A | 8/1990 | Sandaiji et al. | |
| 5,012,572 A | 5/1991 | Matsuzawa et al. | |
| 5,020,213 A | 6/1991 | Aronoff et al. | |
| 5,156,704 A | 10/1992 | Kemp | |
| 5,297,330 A | 3/1994 | Matsuzawa et al. | |
| 5,327,638 A | 7/1994 | Haines et al. | |
| 5,353,180 A | 10/1994 | Murray | |
| 5,359,480 A | 10/1994 | Nepela et al. | |
| 5,396,387 A | 3/1995 | Murray | |
| 5,406,432 A | 4/1995 | Murray | |
| 5,473,485 A | 12/1995 | Leung et al. | |
| 5,509,554 A | 4/1996 | Samuelson et al. | |
| 5,516,430 A | 5/1996 | Hussinger | |
| 5,528,819 A | 6/1996 | McKay et al. | |
| 5,537,732 A | 7/1996 | Fukuda et al. | |
| 5,568,981 A | 10/1996 | Nepela et al. | |
| 5,606,476 A | 2/1997 | Chang et al. | |

(Continued)

FOREIGN PATENT DOCUMENTS

EP   0013363 A1   7/1980

(Continued)

OTHER PUBLICATIONS

U.S. Appl. No. 11/050,536, filed Feb. 2, 2005, Sun et al.

(Continued)

*Primary Examiner*—William J Klimowicz

(57) ABSTRACT

A head for use in a magnetic hard disk drive or other information storage device includes a novel air bearing surface. The novel air bearing surface includes two leading pads separated by a longitudinal channel, and a trailing pad. The leading pads and trailing pad each include a major surface that lies in a first plane. A side pad, laterally spaced from the trailing pad, includes a major surface that lies in a second plane that is parallel to the first plane but that is offset from the first plane by a shallow recess depth in the range of 0.5 microinches to two microinches. The side pad also includes a major surface that lies in a third plane that is parallel to the second plane but that is offset from the first plane by standard recess depth in the range of three to five microinches.

11 Claims, 3 Drawing Sheets

U.S. PATENT DOCUMENTS

| | | | |
|---|---|---|---|
| 5,685,645 | A | 11/1997 | Nepela et al. |
| 5,687,045 | A | 11/1997 | Okai et al. |
| 5,704,715 | A | 1/1998 | Chang et al. |
| 5,754,367 | A | 5/1998 | Chang et al. |
| 5,889,634 | A | 3/1999 | Chang et al. |
| 5,926,343 | A | 7/1999 | Dorius et al. |
| 5,926,344 | A | 7/1999 | Kimura |
| 5,939,133 | A | 8/1999 | Ganapathi et al. |
| 5,967,880 | A | 10/1999 | Major |
| 6,004,472 | A | 12/1999 | Dorius et al. |
| 6,007,664 | A | 12/1999 | Kuizenga et al. |
| 6,021,020 | A | 2/2000 | Itoh et al. |
| 6,137,656 | A | 10/2000 | Levi et al. |
| 6,144,528 | A | 11/2000 | Anaya-Dufresne et al. |
| 6,147,838 | A | 11/2000 | Chang et al. |
| 6,178,064 | B1 | 1/2001 | Chang et al. |
| 6,188,547 | B1 | 2/2001 | Gui et al. |
| 6,229,671 | B1* | 5/2001 | Boutaghou et al. ........ 360/235.1 |
| 6,229,672 | B1 | 5/2001 | Lee et al. |
| 6,233,118 | B1 | 5/2001 | Boutaghou et al. |
| 6,339,518 | B1 | 1/2002 | Chang et al. |
| 6,344,949 | B1 | 2/2002 | Albrecht et al. |
| 6,351,345 | B1 | 2/2002 | Kameyama |
| 6,356,412 | B1 | 3/2002 | Levi et al. |
| 6,424,494 | B1 | 7/2002 | Koishi |
| 6,445,542 | B1 | 9/2002 | Levi et al. |
| 6,477,013 | B1 | 11/2002 | Kang et al. |
| 6,529,346 | B2 | 3/2003 | Otsuka |
| 6,583,961 | B2 | 6/2003 | Levi et al. |
| 6,606,222 | B1 | 8/2003 | Ryun |
| 6,624,977 | B1 | 9/2003 | Boutaghou |
| 6,646,831 | B1* | 11/2003 | Takagi et al. ............. 360/234.3 |
| 6,657,820 | B2 | 12/2003 | Kohira et al. |
| 6,661,611 | B1 | 12/2003 | Sannino et al. |
| 6,683,755 | B2* | 1/2004 | Koishi ..................... 360/235.6 |
| 6,710,964 | B1 | 3/2004 | Rao et al. |
| 6,728,070 | B2 | 4/2004 | Koishi |
| 6,771,468 | B1 | 8/2004 | Levi et al. |
| 6,879,464 | B2 | 4/2005 | Sun et al. |
| 6,956,719 | B2 | 10/2005 | Mundt et al. |
| 6,989,967 | B2 | 1/2006 | Pendray et al. |
| 7,072,145 | B2* | 7/2006 | Deng et al. ............. 360/235.5 |
| 7,123,448 | B1* | 10/2006 | Boutaghou et al. ........ 360/235.3 |
| 7,145,752 | B2* | 12/2006 | Ueda et al. ............... 360/235.6 |
| 7,154,709 | B2 | 12/2006 | Rao et al. |
| 7,200,918 | B2* | 4/2007 | Lille ........................ 29/603.12 |
| 7,262,937 | B2* | 8/2007 | Pendray et al. .......... 360/235.1 |
| 7,289,299 | B1 | 10/2007 | Sun et al. |
| 2001/0019467 | A1* | 9/2001 | Otsuka et al. ............ 360/235.2 |
| 2002/0008939 | A1 | 1/2002 | Boutaghou et al. |
| 2002/0030938 | A1 | 3/2002 | Boutaghou et al. |
| 2002/0063996 | A1 | 5/2002 | Berg |
| 2002/0067575 | A1 | 6/2002 | Brand |
| 2002/0071216 | A1 | 6/2002 | Sannino et al. |
| 2002/0075593 | A1* | 6/2002 | Ultican et al. ................ 360/122 |
| 2002/0089789 | A1* | 7/2002 | Baba et al. ................ 360/235.7 |
| 2003/0227717 | A1 | 12/2003 | Cha et al. |
| 2003/0231429 | A1 | 12/2003 | Boutaghou |
| 2004/0201923 | A1* | 10/2004 | Rao et al. ................. 360/235.7 |
| 2005/0190500 | A1* | 9/2005 | Song ....................... 360/235.5 |
| 2005/0264913 | A1 | 12/2005 | Ruiz |
| 2006/0023358 | A1 | 2/2006 | Huang |
| 2006/0114611 | A1* | 6/2006 | Zhu et al. ................. 360/235.7 |
| 2007/0121251 | A1 | 5/2007 | Yoshida |

FOREIGN PATENT DOCUMENTS

| | | | |
|---|---|---|---|
| EP | 0335732 | B1 | 10/1989 |
| EP | 0361809 | B1 | 4/1990 |
| EP | 0432869 | A2 | 6/1991 |
| EP | 0442660 | B1 | 8/1991 |
| EP | 0449535 | B1 | 10/1991 |
| EP | 0499473 | B1 | 8/1992 |
| EP | 0543637 | B1 | 5/1993 |
| EP | 0583985 | A2 | 2/1994 |
| EP | 0617408 | A2 | 9/1994 |
| JP | 07-182623 | | 7/1995 |
| JP | 08-083416 | | 3/1996 |
| JP | 08-129716 | | 5/1996 |
| JP | 08-190711 | | 7/1996 |
| JP | 09-212836 | | 8/1997 |
| JP | 09-297908 | | 11/1997 |
| JP | 10-106130 | | 4/1998 |
| JP | 10-247367 | | 9/1998 |
| JP | 10-302237 | | 11/1998 |
| JP | 11-007603 | | 1/1999 |
| JP | 11-086250 | | 3/1999 |
| JP | 11-144416 | | 5/1999 |
| WO | WO 98/16931 | A1 | 4/1998 |

OTHER PUBLICATIONS

U.S. Appl. No. 10/185,964, filed Jun. 27, 2002 (includes Prelimin Amendment filed on same day), 56 pages.

U.S. Appl. No. 10/223,922, filed Aug. 19, 2002, 33 pages.

* cited by examiner

AIR BEARING SLIDER WITH A SIDE PAD HAVING A SHALLOW RECESS DEPTH

FIELD OF THE INVENTION

The present invention relates generally to the field of information storage devices, and more particularly to air bearing sliders used in such devices.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

The typical hard disk drive includes a head disk assembly (HDA) and a printed circuit board (PCB) attached to a disk drive base of the HDA. Referring now to FIG. 1, the head disk assembly 100 includes at least one disk 102 (such as a magnetic disk, magneto-optical disk, or optical disk), a spindle motor 104 for rotating the disk, and a head stack assembly (HSA) 106. The spindle motor typically includes a rotating hub on which disks mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The printed circuit board assembly includes electronics and firmware for controlling the rotation of the spindle motor and for controlling the position of the HSA, and for providing a data transfer channel between the disk drive and its host. The head stack assembly 106 typically includes an actuator, at least one head gimbal assembly (HGA) 108 that includes a head, and a flex cable assembly 110.

During operation of the disk drive, the actuator must rotate to position the heads adjacent desired information tracks on the disk. The actuator includes a pivot bearing cartridge 112 to facilitate such rotational positioning. One or more actuator arms extend from the actuator body. An actuator coil 114 is supported by the actuator body opposite the actuator arms. The actuator coil is configured to interact with one or more fixed magnets in the HDA, typically a pair, to form a voice coil motor. The printed circuit board assembly provides and controls an electrical current that passes through the actuator coil and results in a torque being applied to the actuator. A crash stop is typically provided to limit rotation of the actuator in a given direction, and a latch is typically provided to prevent rotation of the actuator when the disk dive is not in use.

In a magnetic hard disk drive, the head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive. In a magnetic hard disk drive, the transducer is typically supported in very close proximity to the magnetic disk by a hydrodynamic air bearing. As the motor rotates the magnetic disk, the hydrodynamic air bearing is formed between an air bearing surface of the slider of the head, and a surface of the magnetic disk. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

Since the flying height is a key design parameter that affects the performance of an information storage device, it is important that it not vary undesirably during operation. The flying height, and therefore the spacing between the transducer or objective lens and the disk surface, depends strongly on the design of the air bearing surface. Optimally the flying height would remain at a desired value, but that is not achieved in practical devices. Manufacturing variations changes in the operating environment, or changes in the position of the air bearing surface of the slider tend to cause undesirable changes in flying height.

One environmental factor that can cause an undesirable change in flying height is the ambient pressure of the atmosphere. The ambient pressure is lower at high altitudes than at sea level, yet an information storage device must be designed to operate in both environments. An air bearing that is designed to minimize the effect of this environmental factor on flying height is said to have enhanced "altitude insensitivity."

An example of a manufacturing variation that can cause an undesirable change in flying height is the longitudinal out-of-plane curvature of the air bearing surface, commonly known as the "crown" of the air bearing surface. An air bearing that is designed to minimize the effect of this manufacturing variation on flying height is said to have enhanced "crown insensitivity." Lateral out-of-plane curvature of the air bearing surface can also vary in manufacturing. An air bearing that is designed to minimize the effect of this manufacturing variation on flying height is said to have enhanced "camber insensitivity." Such enhanced crown insensitivity and camber insensitivity also tends to reduce flying height variation due to curvatures that may be present in the spinning disk surface.

Another example of a manufacturing variation that can cause an undesirable change in flying height is the pre-load force (also known as "gram load") that presses the air bearing slider against the spinning disk surface during operation. An air bearing that is designed to minimize the effect of this manufacturing variation on flying height is said to have enhanced "gram load insensitivity".

An undesirable change in flying height can also result from a change in the linear velocity of the disk surface that is experienced by the air bearing slider during operation. Although the spindle motors that rotate the disk or disks in information storage devices are typically able to control the angular velocity of the spinning disk within a tight tolerance, the linear velocity of the disk surface at the outer diameter (OD) of the disk is typically much higher than the linear velocity of the disk surface at the inner diameter (ID) of the disk. As a result, the flying height may tend to vary depending on the radial position of the slider relative to the disk. An air bearing that is designed to minimize the effect on flying height due to a change in linear disk velocity is said to have an acceptably "flat flying height profile."

The miniaturization of disk drives has exacerbated several of the challenges to air bearing design. For example, in so-called smaller "form factor" disk drives, the linear velocity of the disk at the ID is relatively low compared to that in larger disk drives. Smaller disk drives may also employ smaller recording heads, for example so-called "pico" sliders or "femto" sliders. Such sliders make available a smaller total footprint for the air bearing surface than larger sliders, and therefore confine air bearing design to a smaller physical space. The resulting reduction in slider length challenges air bearing designers to give the air bearing adequate pitch stiffness to resist applied pitch torques. The resulting reduction in air bearing width challenges air bearing designers to give the air bearing adequate roll stiffness to resist applied roll torques.

Head-disk interface tribological concerns, and robustness to mechanical shock events, has led to the widespread employment of a ramp (e.g. ramp 116 in FIG. 1) within the disk drive to unload recording heads from proximity to the surface of the disk when the disk drive is not in use. Ramp load/unload presents additional challenges to the air bearing designer. For example, to avoid damage to the disk surface during loading, it is important that the air bearing establish itself quickly despite any initial pitch bias and/or initial roll bias that would otherwise tend to bring the slider corners in contact with the disk surface. Furthermore, to facilitate unloading it is desirable that the air bearing allows the slider to be easily lifted off the slider from the disk surface (despite any negative pressure regions of the air bearing).

Therefore, what is needed in the art is an air bearing design that can provide an adequately flat flying height profile, for example in a small form-factor storage device utilizing ramp load/unload of the slider, and is adequately insensitive to one or more factors affecting flying height variation.

SUMMARY

A head for use in a magnetic hard disk drive or other information storage device includes a novel air bearing surface. The novel air bearing surface includes two leading pads separated by a longitudinal channel. Each leading pad includes a major surface that lies in a first plane. The air bearing includes a trailing pad having a major surface that lies in the first plane, and a side pad laterally spaced from the trailing pad. The side pad includes a major surface that lies in a second plane that is parallel to the first plane but that is offset from the first plane by a shallow recess depth in the range of 0.5 microinches to two microinches. The side pad also includes a major surface that lies in a third plane that is parallel to the second plane but that is offset from the first plane by standard recess depth in the range of three to five microinches.

DETAILED DESCRIPTION OF EXEMPLARY EMBODIMENTS

Figure 1:
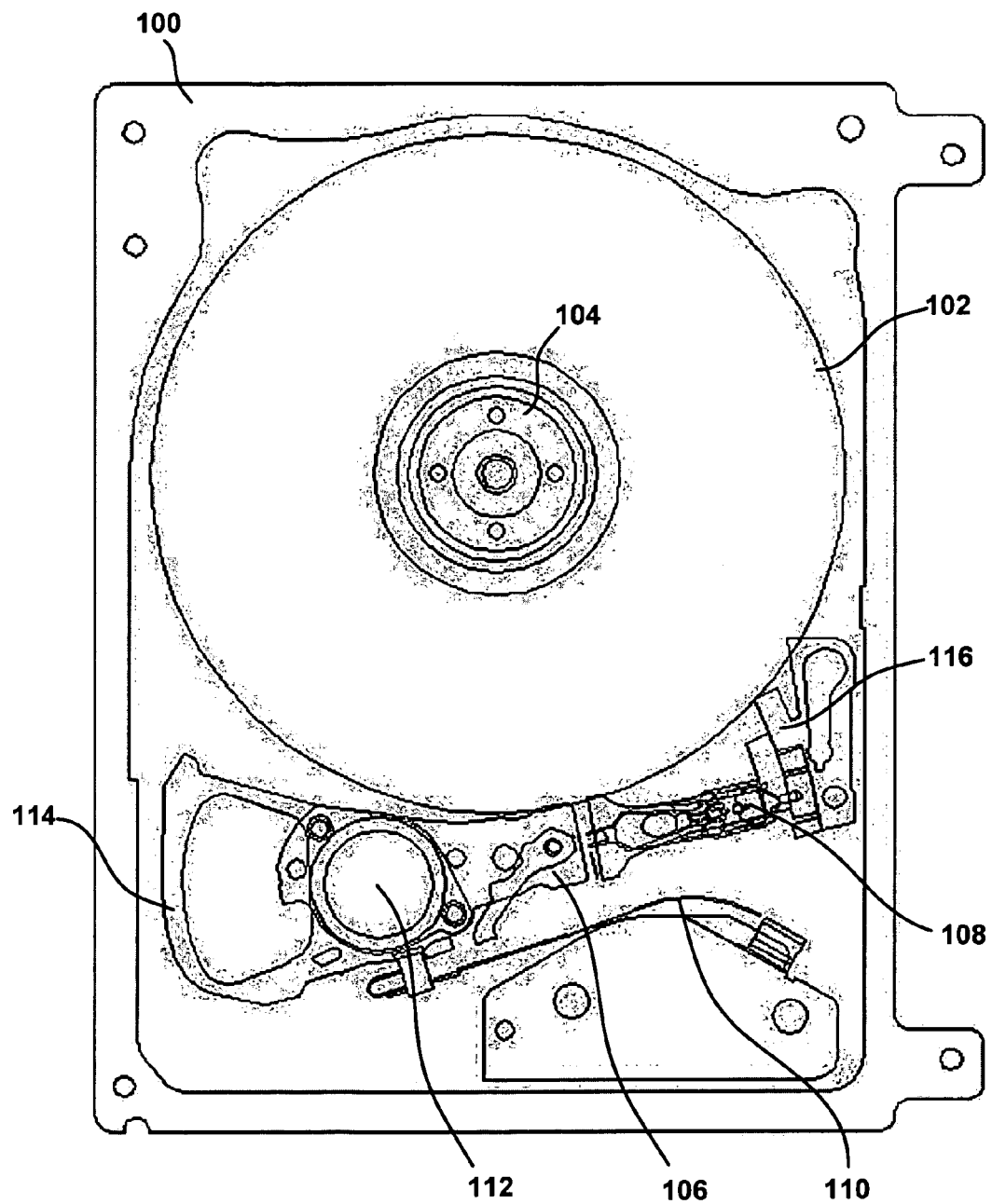
FIG. 1 depicts a contemporary hard disk drive information storage device.
Figure 2:
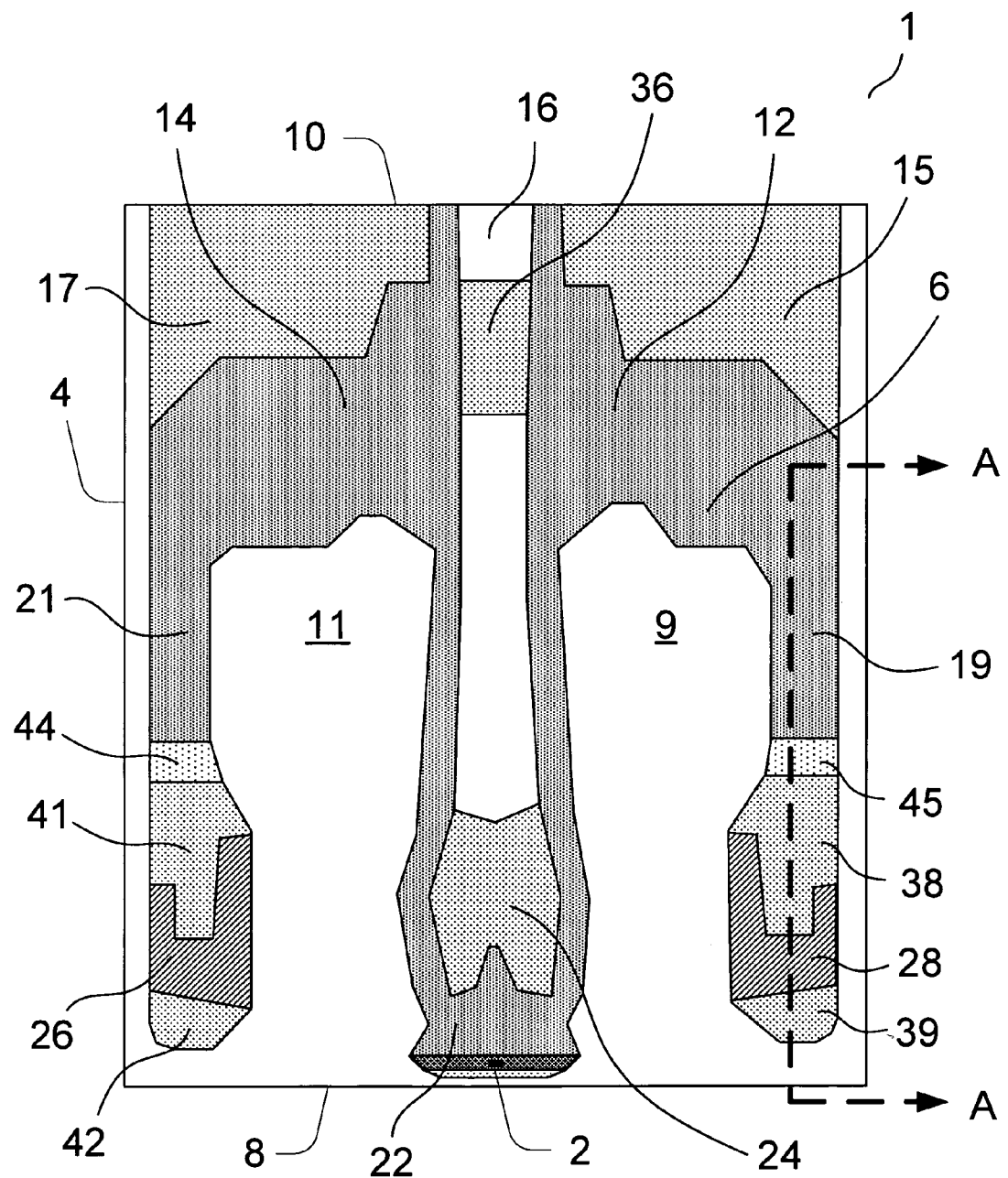
FIG. 2 is an air bearing surface view of a head according to an exemplary embodiment of the present invention (not necessarily to scale).

Now referring to FIG. 2, head 1 comprises a transducer 2 for at least reading information from the disk. In certain embodiments, the transducer 2 is a merged thin film magnetic transducer comprising an inductive writer and magneto resistive read element. In such embodiments, the magneto resistive element may be a giant magneto resistive element (GMR) or tunneling magneto resistive element (TMR). In such embodiments, the writer may be a perpendicular magnetic recording (PMR) writer.

Head 1 also comprises a slider 4, which is typically fabricated from a ceramic material such as alumina titanium carbide. Slider 4 includes an air bearing surface 6, which may be formed on the surface of slider 4 by etching or ion milling and has a geometry that may be defined by use of a mask. The head 1 also includes a trailing face 8, and a leading face 10.

Figure 3:
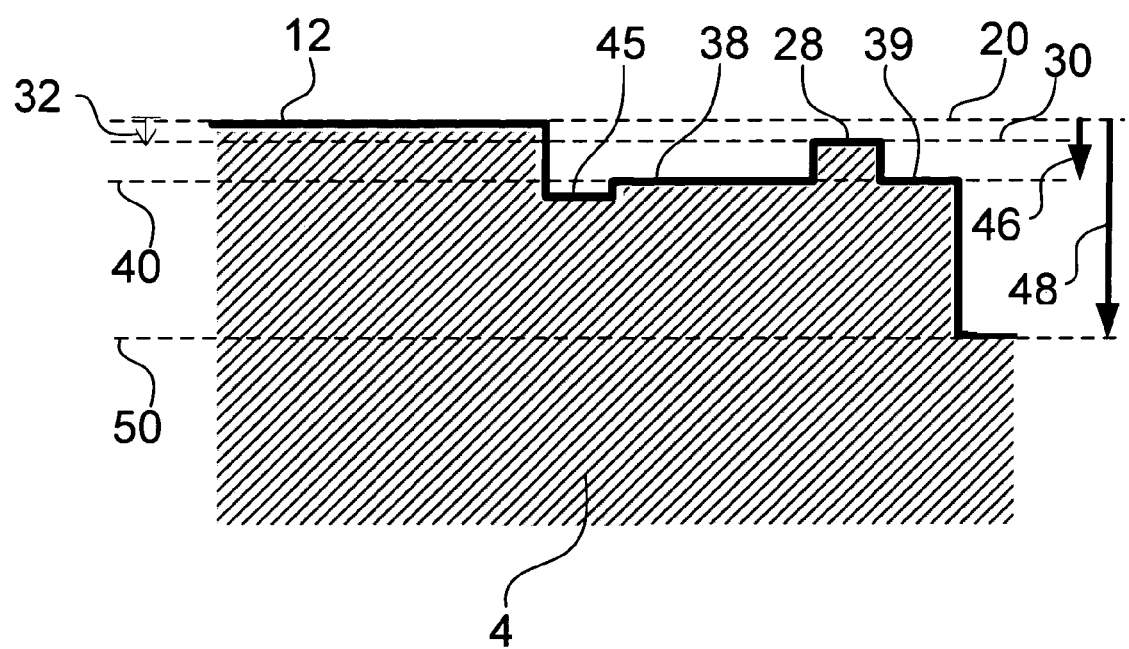
FIG. 3 is cross-sectional view of the head shown in FIG. 2, taken along the plane of cross-section designated as A-A in FIG. 2. For clarity, only the region of the cross-section near the air bearing surface is shown in FIG. 3 and the step heights are not to scale but rather are exaggerated so as to be easily discernible.

In the exemplary embodiment shown in FIG. 2 and FIG. 3, the air bearing surface 6 includes central cavities 9 and 11. During operation, the central cavities 9 and 11 can develop a sub-ambient pressure region between the slider 4 and the surface of and adjacent disk that may serve to reduce flying height sensitivity to changes in altitude.

In the exemplary embodiment shown in FIG. 2 and FIG. 3, the air bearing surface 6 also includes two leading pads 12 and 14 that are adjacent to the central cavities 9 and 11, respectively. The two leading pads 12, 14 are separated by a longitudinal channel 16. In certain embodiments, the longitudinal channel 16 has a maximum width that is in the range of 50 microns to 200 microns. The leading pads 12 and 14 are not recessed and instead establish an air bearing surface datum plane (hereinafter referred to as the first plane) 20, from which the recession of other surfaces parallel to the first plane 20 may be measured. During operation, the leading pad 12 and 14 can develop a super-ambient pressure region between the slider 4 and the surface of an adjacent disk, causing the slider to assume a positive pitch attitude.

In the exemplary embodiment of FIG. 2 and FIG. 3, the air bearing surface 6 also includes a trailing pad 22 that is not recessed from the first plane 20. An aft region of the trailing pad 22 is nearly adjacent to the transducer 2. During operation, the trailing center pad 22 can develop a super-ambient pressure region between the slider 4 and the surface of an adjacent disk that can help maintain a desired flying height at the location of transducer 2.

In the embodiment of FIG. 2 and FIG. 3, the trailing pad 22 also includes a forward step surface 24 that lies in a plane 40 that is recessed from the first plane 20 by a standard recess depth 46, which is in the range of three to five microinches. The standard recess depth 46 is less than the recession 48 of the central cavities 9 and 11. Note that the central cavities 9 and 11 lie in plane 50 which is preferably recessed from the first plane 20 by a recession 48 in the range 25 microinches to 70 microinches for pico slider applications, or microinches to 50 microinches for fempto slider applications. In certain embodiments, the longitudinal channel 16 has a depth, measured below the first plane 20, that is also in the range of 25 microinches to 70 microinches for pico slider applications, or 15 microinches to 50 microinches for femto slider applications. During operation, the forward step surface 24 can help develop super-ambient pressure between the trailing pad 22 and the surface of an adjacent disk. Such enhanced pressurization may reduce the surface area required for the trailing pad 22.

In certain embodiments, the air bearing surface 6 may also include two leading step regions 15 and 17 that are adjacent to the leading pads 12 and 14, respectively, so that the leading pads 12 and 14 lie between the leading step regions 15 and 17 and the central cavities 9 and 11, respectively. In such embodiments, the leading step regions 15 and 17 lie in recessed plane 40 that is recessed from the first plane 20 by standard recess depth 46. During operation, the leading step regions 15 and 17 can serve as part of a vertically converging channel to help develop super-ambient pressure between the leading pads 12 and 14, respectively and the surface of an adjacent disk.

In certain embodiments, the air bearing surface 6 may also include two side rails 19 and 21 that are adjacent central cavities 9 and 11, respectively. During operation, the side rails 19 and 21 can serve to bound and enhance the sub-ambient pressure developed in the central cavities 9 and 11, respectively, and to shift a region of sub-ambient pressure rearward (towards the trailing edge of the slider). Such a shift can facilitate lifting off the slider from the disk surface dynamically, during operation.

In the embodiment of FIG. 2 and FIG. 3, the air bearing surface 6 also includes side pads 26 and 28, each being laterally spaced from the trailing pad 22. The side pads 26 and 28 each include a major surface that lies in a second plane 30 that is parallel to the first plane 20 but that is recessed from the first plane by a shallow recess depth 32. Shallow recess depth 32 can be in the range of 0.5 microinches to two microinches, but is preferably in the range of 1 microinch to 1.5 microinches. The side pads 26 and 28 also include major surfaces 38, 39, 41, 42, each lying in the third plane 40 that is parallel to the second plane 30 but that is offset from the first plane by standard recess depth 46. In certain embodiments, the major surfaces of the side pads 26, 28 that lie in the second plane 30 preferably extend to less than 125 microns from an edge of the trailing face 8.

In the embodiment of FIG. 2 and FIG. 3, side pads 26 and 28 are separated from side rails 21 and 19, respectively, by separation regions 44 and 45, respectively. Separation regions 44 and 45 include major surfaces that can be recessed from the first plane 20 by a recession that is approximately equal to the sum of shallow recess depth 32 and standard recess depth 46. The shallow recess depth 32, standard recess depth 46, and recession 48, are each preferably created by an etching process such as ion milling or reactive ion etching. In that case, the recession of the separation regions 44 and 45 can be created without the need for any additional process steps by simply defining common areas in the mask used in the etching step to create recession 32 and in the mask used in the etching step to create recession 46.

In certain embodiments, the longitudinal channel 16 includes a recessed plug 36 that includes a plug top surface in the third plane 40. The recessed plug 36 can extend to less than 450 microns from an edge of the leading face 10 in pico slider applications. The recessed plug 36 can extend to less than 200 microns from an edge of the leading face 10 in femto slider applications. The recessed plug 36 preferably extends to less than 40 microns from an edge of the leading face 10. The recessed plug 36 preferably has a maximum length that is less than 400 microns.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

What is claimed is:

1. A head comprising:
a slider having an air bearing surface, a trailing face, and a leading face, the air bearing surface including
two leading pads separated by a longitudinal channel, each leading pad including a major surface that lies in a first plane,
a trailing pad, the trailing pad also including a major surface that lies in the first plane, and
a side pad laterally spaced from the trailing pad,
the side pad including a major surface that lies in a second plane that is parallel to the first plane but that is offset from the first plane by a shallow recess depth in the range of 0.5 microinches to two microinches,
the side pad also including a major surface that lies in a third plane that is parallel to the second plane but that is offset from the first plane by standard recess depth in the range of three to five microinches.

2. The head of claim 1 wherein the shallow recess depth is in the range of 1 microinch to 1.5 microinches.

3. The head of claim 1 wherein the major surface of the side pad that lies in the second plane extends to less than 125 microns from an edge of the trailing face.

4. The head of claim 1 wherein the longitudinal channel has a maximum width that is in the range of 50 microns to 200 microns.

5. The head of claim 1 wherein the longitudinal channel has a depth, measured below the first plane, that is in the range of 15 microinches to 50 microinches.

6. The head of claim 1 wherein the longitudinal channel has a depth, measured below the first plane, that is in the range of 25 microinches to 70 microinches.

7. The head of claim 1 wherein the longitudinal channel includes a recessed plug that includes a plug top surface in the third plane.

8. The head of claim 7 wherein the recessed plug extends to less than 450 microns from an edge of the leading face.

9. The head of claim 7 wherein the recessed plug extends to less than 200 microns from an edge of the leading face.

10. The head of claim 7 wherein the recessed plug extends to less than 40 microns from an edge of the leading face.

11. The head of claim 7 wherein the recessed plug has a maximum length that is less than 400 microns.

\* \* \* \* \*